Sept. 21, 1954
A. B. ERICKSON
2,689,429
SPARROW AND RAT TRAP
Filed May 29, 1952
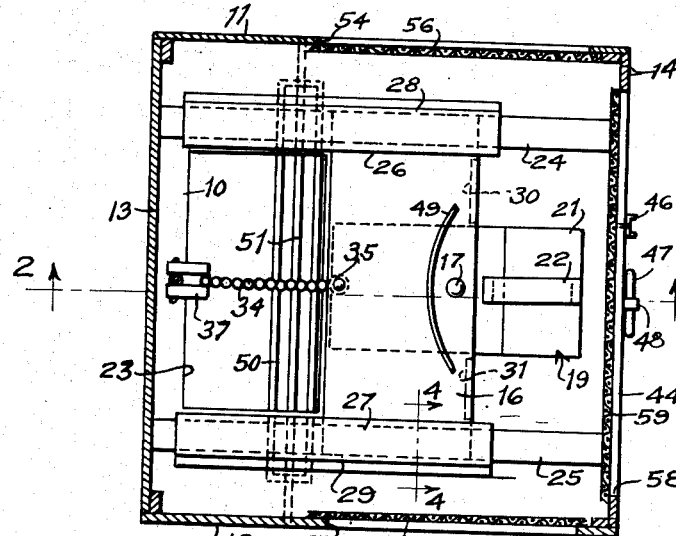
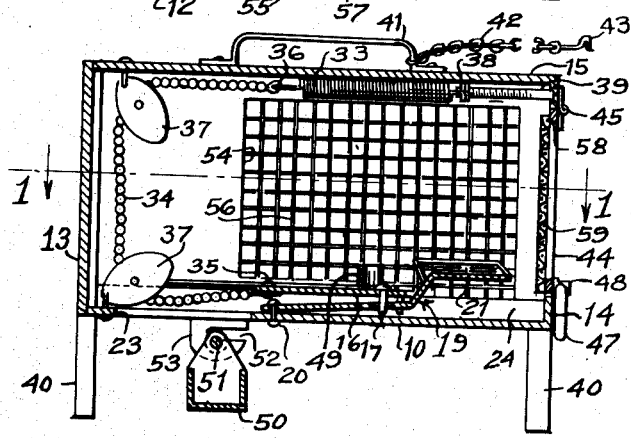
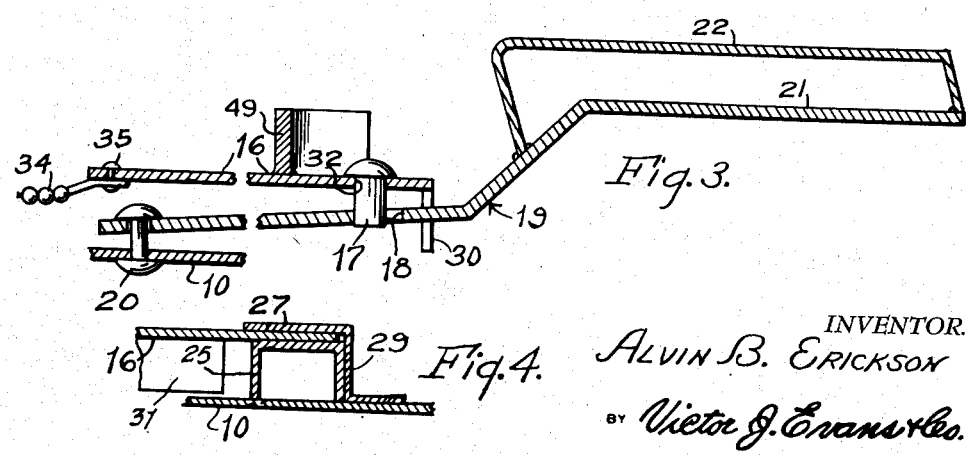
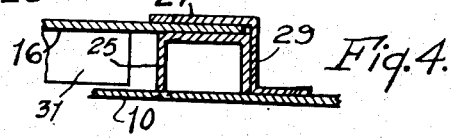
INVENTOR.
ALVIN B. ERICKSON
BY Victor J. Evans & Co.
ATTORNEYS Patented Sept. 21, 1954

2,689,429

UNITED STATES PATENT OFFICE 2,689,429

SPARROW AND RAT TRAP

Alvin B. Erickson, Alma Center, Wis.

Application May 29, 1952, Serial No. 290,630

2 Claims. (Cl. 43—61)

This invention relates to animal traps of the type having a cage with a sliding door for covering an opening in the bottom and in which the door is actuated to the closed position by a spring when released by a trigger having a platform positioned to receive birds, rats and the like.

The purpose of this invention is to provide a trap for birds, rats, and other animals that will travel upwardly through an opening in the floor of a cage.

Various types of trigger actuated traps have been provided for catching animals, however, for some types of animals it is more advantageous to provide means for the animal to pass upwardly through an opening in the floor or bottom of the trap, instead of entering from the end or side as is common in conventional traps. With this thought in mind this invention contemplates a cage elevated on legs and having a sliding door positioned to close an opening in the bottom whereby with the door retained in the open position with a trip device and with feed positioned below the cage animals will travel upwardly through the opening in the bottom and actuate the trip mechanism for closing the trap.

The object of this invention is, therefore, to provide means for forming an animal trap wherein animals entering through an opening in the bottom are caught in the trap.

Another object of the invention is to provide a trap that may readily be reset.

A further object of the invention is to provide an animal trap for catching animals that pass upwardly through an opening in the floor thereof in which the trap is of a simple and economical construction.

With these and other objects and advantages in view the invention embodies a cage having a base with upwardly extended side and end walls and a cover, with the base which is provided with an opening, spaced by legs above a surface upon which the trap is positioned, and a trigger actuated door slidably mounted in the trap and positioned to cover the opening through the base.

Other features and advantages of the invention will appear from the following description taken in connection with the drawing, wherein:

Figure 1 is a sectional plan through the trap taken on line 1—1 of Fig. 2.

Figure 2 is a longitudinal section through the trap taken on line 2—2 of Fig. 1.

Figure 3 is a detail showing a fragmentary section substantially on line 2—2 of Fig. 1 illustrating the trip device including the trigger and platform and showing the parts on an enlarged scale.

Figure 4 is a cross section through a rail of the sliding door taken on line 4—4 of Fig. 1.

Referring now to the drawing wherein like reference characters denote corresponding parts the improved animal trap of this invention includes a cage having a base or bottom 10 with side walls 11 and 12, end walls 13 and 14 and a cover 15, a door 16 slidably mounted on the base and having a pin 17 extended through an opening 32, and a trigger 19 that is loosely mounted by a rivet 20 on the floor 10 and that is provided with a platform 21 having a strip 22 extended from the upper edge thereof.

The base or floor 10 is provided with an opening 23 and the door 16, which is positioned to close the opening, is mounted on parallel rails 24 and 25 with the edges positioned below flanges 26 and 27 of Z-bars 28 and 29, respectively, as illustrated in Fig. 4.

One edge of the door 16 is provided with depending flanges 30 and 31 that straddle the trigger 19 and the pin 17, which is secured in an opening 32 in the door 16 extends downwardly into an opening 18 of the trigger 19 whereby upon downward movement of the platform 21 and trigger 19, the pin is released from the trigger and the pin with the door in which it is mounted are actuated by a spring 33 so that the door covers the opening 23.

The door 16 is connected to the spring 33 with a flexible chain 34 that is secured to the door 16 at the point 35 and to an eye 36 on the end of the spring 33. The chain is positioned to travel through pulley blocks 37 and the opposite end of the spring is attached to a collar 38 on the end of a screw 39 positioned in the end 14 of the cage. By this means the tension of the spring is adjusted by turning the screw 39, so that just sufficient force is provided to draw the door over the opening.

The cage is supported on legs 40, which extend downwardly at the corners and the cover 15 is provided with a handle 41 with which the cage may be carried and through which the cage may be anchored or secured to a fixed element with a chain 42, the outer end of which is provided with a hook 43.

The cage is provided with a door 44 that is secured to the upper portion of the end wall 14 by hinges 45 and the door is secured in the closed position with a conventional button latch 46 that is pivotally mounted on the end wall 14 and positioned to overlap the lower edge of the door. The door is also provided with a ring 47 that is pivotally mounted in a clip 48 on the lower edge of the door.

The upper surface of the door 16 is provided with an arcuate baffle 49 which facilitates gripping the door for setting the trap.

The cage is also provided with a feed hopper or trough 50 that is suspended from a rod 51, the ends of which are positioned in slots 52 in clips 53 that extend downwardly from the base 10. With the feed trough suspended in this manner it may readily be removed for cleaning and refilling.

The frame of the trap may be of any suitable design and in the design shown the panels or side walls 11 and 12 are provided with openings 54 and 55 that are covered with wire mesh sections 56 and 57, respectively and the door 44 is provided with an opening 58 that is covered with wire mesh as indicated by the numeral 59.

With the parts arranged in this manner bait may be placed in the trough 50 or placed in the cage on the platform and animals passing into the cage through the opening 23 engage the platform 21 whereby the door 16 is released and snapped to the closed position by the spring 33. The trap is readily reset by opening the door 44, elevating the platform 21 and moving the door 16 to locate the pin 17 so that it extends into the opening 18 of the trigger.

The trap is particularly adapted for English sparrows; however, it may also be used for rats and other animals.

It will be understood that modifications may be made in the design and arrangement of the parts without departing from the spirit of the invention.

What is claimed is:

1. In a trap, the combination which comprises a cage having a base, side and end walls and a cover and having an opening through the base, said side walls and one of the end walls having openings therethrough, wire mesh covering the openings of the side walls, a door having an opening covered with wire mesh hinged to the end wall provided with the opening and mounted to cover said opening, parallel tracks on the base positioned to straddle the opening therethrough, a second door slidably mounted on the parallel tracks of the base and positioned to cover said opening, pulley blocks having pulleys journaled therein mounted in said trap, a chain, a spring mounted in the cage and connected to the second door by said chain which is trained over the pulleys of the pulley blocks, said spring being positioned to close the second door, a trigger having a platform extended therefrom and having a loose connection with the cage and having an opening therethrough, a pin secured to the second door and positioned to extend through the opening of the trigger with the second door in the open position, said trigger and platform being positioned to retain the second door in the open position against tension of the spring and adapted to release the second door upon the application of weight to the platform, and a latch for retaining the door in the end wall of the cage in the closed position.

2. In a trap, the combination which comprises a cage having a base, side and end walls and a cover and having an opening through the base, said side walls and one of the end walls having openings therethrough, wire mesh covering the openings of the side walls, a door having an opening covered with wire mesh hinged to the end wall provided with the opening and mounted to cover said opening, parallel tracks on the base positioned to straddle the opening therethrough, a second door slidably mounted on the parallel tracks of the base and positioned to cover said opening, pulley blocks having pulleys journaled therein mounted in said trap, a chain, a spring mounted in the cage and connected to the second door by said chain which is trained over the pulleys of the pulley blocks, said spring being positioned to close the second door, a trigger having a platform extended therefrom and having a loose connection with the cage and having an opening therethrough, a pin secured to the second door and positioned to extend through the opening of the trigger with the second door in the open position, said trigger and platform being positioned to retain the second door in the open position against tension of the spring and adapted to release the second door upon the application of weight to the platform, a latch for retaining the door in the end wall of the cage in the closed position, and a food trough suspended below the base and positioned below the opening through the base.

References Cited in the file of this patent

UNITED STATES PATENTS

| Number | Name | Date |
|---|---|---|
| 639,246 | Kagarier | Dec. 19, 1899 |
| 866,978 | Turner | Sept. 24, 1907 |
| 1,065,835 | Power | June 24, 1913 |
| 1,238,026 | Kvitle | Aug. 21, 1917 |
| 1,345,716 | Sudul | July 6, 1920 |
| 1,718,432 | Qualmann | June 25, 1929 |